(12) United States Patent
Middleton et al.

(10) Patent No.: US 6,353,879 B1
(45) Date of Patent: Mar. 5, 2002

(54) MEMORY ADDRESS TRANSLATION IN A DATA PROCESSING SYSTEM

(75) Inventors: Peter Guy Middleton, Cambridge; David Michael Bull, Balsham, both of (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/252,927

(22) Filed: Feb. 19, 1999

(30) Foreign Application Priority Data

Jul. 3, 1998 (GB) .............................................. 9814528

(51) Int. Cl.$^7$ ............................................. G06F 12/00
(52) U.S. Cl. ........................ 711/202; 711/203; 711/204; 711/213
(58) Field of Search ........................ 711/202–204, 213, 711/221

(56) References Cited

U.S. PATENT DOCUMENTS 4,811,206 A * 3/1989 Johnson ....................... 364/200
6,079,006 A * 6/2000 Pickett ......................... 711/213

FOREIGN PATENT DOCUMENTS

| EP | 0 352 632 | 1/1990 | | |
|---|---|---|---|---|
| GB | 2 261 087 | 5/1993 | | |
| GB | 2261087 | * 5/1993 | ........... | G06F/12/10 |

OTHER PUBLICATIONS

IBM Technical Disclosure Bulletin v22, n2, pp. 743–749, Jul. 1979; "Virtual address translation apparatus"; Beacom, Kindseth and Mitchell.*
Computer Database Record No. 01776608/DIALOG: "Hal reveals multichip SPARC processor"; Gwennap, Linley; Microprocessor Report, v9, n3, pl(7), Mar. 6, 1995, pp. 1 through 17.

* cited by examiner

Primary Examiner—Matthew Kim
Assistant Examiner—Pierre M. Vital
(74) Attorney, Agent, or Firm—Nixon & Vanderhye P.C.

(57) ABSTRACT

A data processing system 2 is provided with a processor core 4 that issues virtual addresses VA that are translated to mapped addresses MA by an address translation circuit 6 based upon a predicted address mapping. The mapped address MA is used for a memory access within a memory system 8. The mapped address MA starts to be used before a mapping validity circuit 6 has determined whether or not the predicted translation was valid. Accordingly, if the predicted address translation turns out to be invalid, then the memory access is aborted. The state of the processor core is preserved either by stretching the processor clock signal or by continuing the processor clock signal and waiting the processor 4. The memory system 8 then restarts the memory access with the correct translated address.

9 Claims, 6 Drawing Sheets

MEMORY ADDRESS TRANSLATION IN A DATA PROCESSING SYSTEM

BACKGROUND OF THE INVENTION

1. Field of the Invention

This invention relates to data processing systems. More particularly, this invention relates to data processing systems in which a virtual address produced by a processor core is translated into a mapped address for use in a memory access.

2. Description of the Prior Art

It is known to provide data processing systems in which a virtual address generated by a processor core for a memory access is translated to a mapped address. The mapped address is then used in the memory access. Such address mappings facilitate the efficient use of the memory resources of the system and the provision of multi-tasking.

A potential limiting factor in the speed of operation of a data processing system is the time taken to issue the mapped address to the memory system. The address translation from the virtual address to the mapped address may often be part of the critical path in determining the maximum processor speed. Accordingly, measures that can alleviate this potential constraint are strongly advantageous.

SUMMARY OF THE INVENTION

Viewed from one aspect the present invention provides apparatus for data processing, said apparatus comprising:

(i) a memory for storing data at mapped addresses within said memory;

(ii) a processor core for requesting a memory access to a virtual address within said memory;

(iii) an address translation circuit for performing a translation of said virtual address to a mapped address in accordance with a current address mapping prediction;

(iv) a memory accessing circuit for accessing data from said memory using said mapped address; and (v) a mapping validity circuit for determining if said translation is valid for use in said memory access; wherein (vi) said mapping validity circuit does not determine if said translation is valid until after said memory accessing circuit has commenced said memory access; and further comprising (vii) an abort circuit for aborting said memory access if said translation is invalid; and (viii) a restart circuit for restarting said memory access with a valid translation of said virtual address to a valid mapped address.

The address mapping performed is usually controlled by an address mapping parameter. Determining the correct address mapping parameter to use for each translation can introduce an additional delay in the issuing of the mapped address and so adversely impact the critical path time and hence overall processor speed. The present invention recognizes this constraint and reduces its effect by predicting the mapping to be used on each occasion and so generating a mapped address before it has been confirmed that the current address mapping will indeed continue to be used. If the prediction of the address mapping turns out to be incorrect, then the memory access that has already been initiated is aborted. The memory access is then restarted using the correct mapped address.

A possible prediction technique is to assume the current address mapping will remain unchanged, and this will lead to some incorrect translations being performed and memory accesses initiated, with these then having to be aborted. Providing a system which makes such "mistakes" would generally be regarded as disadvantageous. However, removing the need to wait for the determination of the validity of the current address mapping from the critical path in the address translation can allow the overall cycle time of the system to be reduced. In practice it is found that the current address mapping generally remains unchanged for long sequences of memory accesses and the time saved by removing the validity check from the critical path more than compensates for the occasional memory access needing to be aborted due to an incorrect assumption being made regarding the address translation.

It will be appreciated that the mapped address produced by the address translation circuit could have many forms, such as the physical address. However, in preferred embodiments of the invention said mapped address is an intermediate form between said virtual address to said physical address.

Providing such a partially translated mapped address may allow more efficient operation within a hierarchical memory structure, e.g. one level of translation being used to accommodate multi-tasking and a further level of translation to the physical address being used to accommodate the peculiarities of the particular hardware implementation.

In this context it is advantageous to provide embodiments in which said memory accessing circuit includes a memory management unit that translates said mapped address to a physical address.

A memory management unit can be used to perform address translation to reach the physical address.

Whilst it is possible to utilize the invention in a system in which the main memory is directly addressed, in preferred embodiments of the system there is provided cache memory, data within said cache being addressed by said mapped address.

A system having a cache memory is generally able to return cached data to the processor core at high speed and in such systems the advantage of reducing any critical path constraint associated with address translation becomes more significant.

The address translation performed by the address translation circuit could take many forms. However, in preferred embodiments said address translation circuit has a translation mode which replaces a bit field within said virtual address with a bit field specified by said address mapping.

Replacing a bit field within the virtual address with another bit field specified by the address mapping allows powerful control of the memory resources whilst being comparatively easy to control and manage.

The advantages associated with bit field replacement in the translation mode are particularly strong in embodiments in which said bit field specified by said address mapping parameter is one-to-one correspondence to a process identifier that is set under program control.

Having a program controlled process identifier used as the replacement bit field is particularly well suited for multi-tasking environments with multiple processes active at any given time.

In order to provide higher level control of the basic operation of the system preferred embodiments of the invention are such that said address translation circuit has a transparent mode in which said bit field within said virtual address is passed unaltered.

Providing a transparent mode allows the core operating system code, and the like, to directly address memory locations without the potential complication of the intervening address translation circuit.

A particularly efficient way of performing the validity check on the address translation such that the result is available in good time to abort a memory access if necessary is one in which said mapping validity circuit compares for equality said bit field within said virtual address of a current memory access with a predetermined bit field to produce an equality result and if said equality result differs from that of a predicted result swaps between said translation mode and said transparent mode.

The programmers model of the system for concurrently executing processes (threads) can be simplified if each process has its address space mapped to start at zero. In order to accommodate this in preferred embodiments said predetermined bit field is all zeros.

It will be appreciated that the memory access may be aborted in a number of different ways. Particularly suitable ways of aborting a memory access without excessive power consumption and without the need for a large amount of circuitry to recover state are ones in which the processor core clock signal is stretched upon abort or the processor core clock signal continues but with the processor controller in a wait state.

Viewed from another aspect the present invention provides a method of data processing, said method comprising the steps of:

(i) storing data at mapped addresses within a memory;

(ii) requesting a memory access to a virtual address within said memory;

(iii) performing a translation of said virtual address to a mapped address in accordance with a current address mapping prediction;

(iv) accessing data from said memory using said mapped address; and (v) determining if said translation is valid for use in said memory access;

wherein (vi) said step of determining does not determine if said translation is valid until after said memory access has commenced; and further comprising the step of (vii) aborting said memory access if said translation is invalid; and (viii) restarting said memory access with a valid translation of said virtual address to a valid mapped address.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
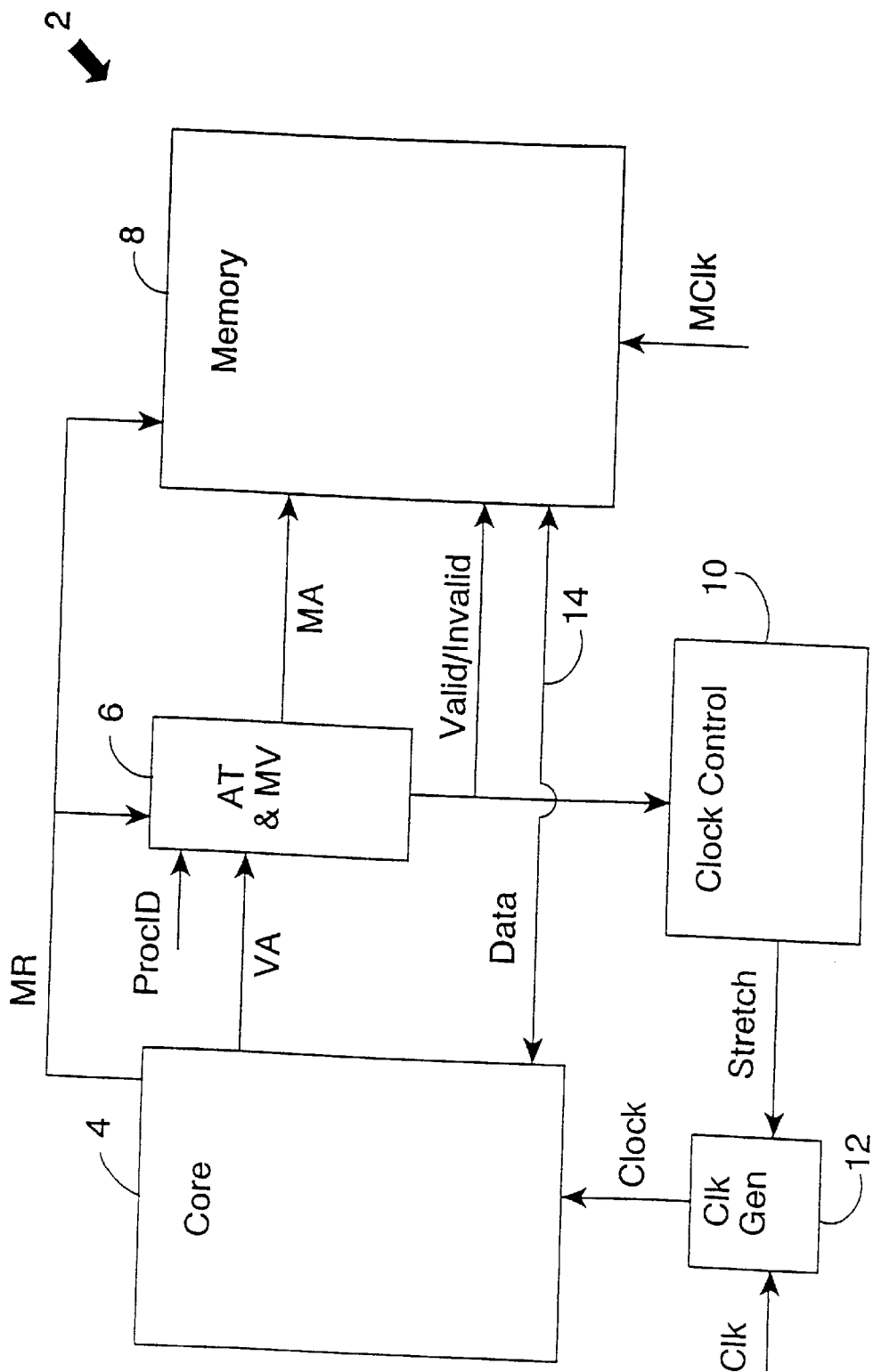
FIG. 1 schematically illustrates a data processing system utilizing virtual address to mapped address translation in accordance with one embodiment of the present invention.

FIG. 1 shows a data processing system 2 comprising a processor core 4 that issues a virtual address VA and a memory request MR to initiate a memory access. The virtual address VA is received by an address translation and mapping validity circuit 6 that performs the partial translation of the virtual address VA to a mapped address MA for addressing a memory system 8.

The mapping validity portion of the circuit 6 determines whether or not the current address mapping being utilized in the circuit 6 is valid only after the mapped address MA has been issued to the memory system 8. If the address mapping used was invalid, then this is indicated to the memory system 8 and a clock control circuit 10 by a Valid/Invalid signal. The memory system 8 responds to the Invalid signal by aborting the current memory access. The memory system 8 is driven by a memory clock system MClk.

The clock control circuit 10 responds to an Invalid signal by issuing a signal to a clock generator 12 that serves to stretch the current clock cycle being supplied to the processor core 4. This will then allow the address translation and mapping validity circuit 6 to correct the mapping being used and generate a correct mapped address MA. The memory access will then be restarted in the memory system 8 in the next MClk cycle. Meanwhile the processor core 4 holds its state until the correct data is being returned via the data bus 14.

Figure 2:
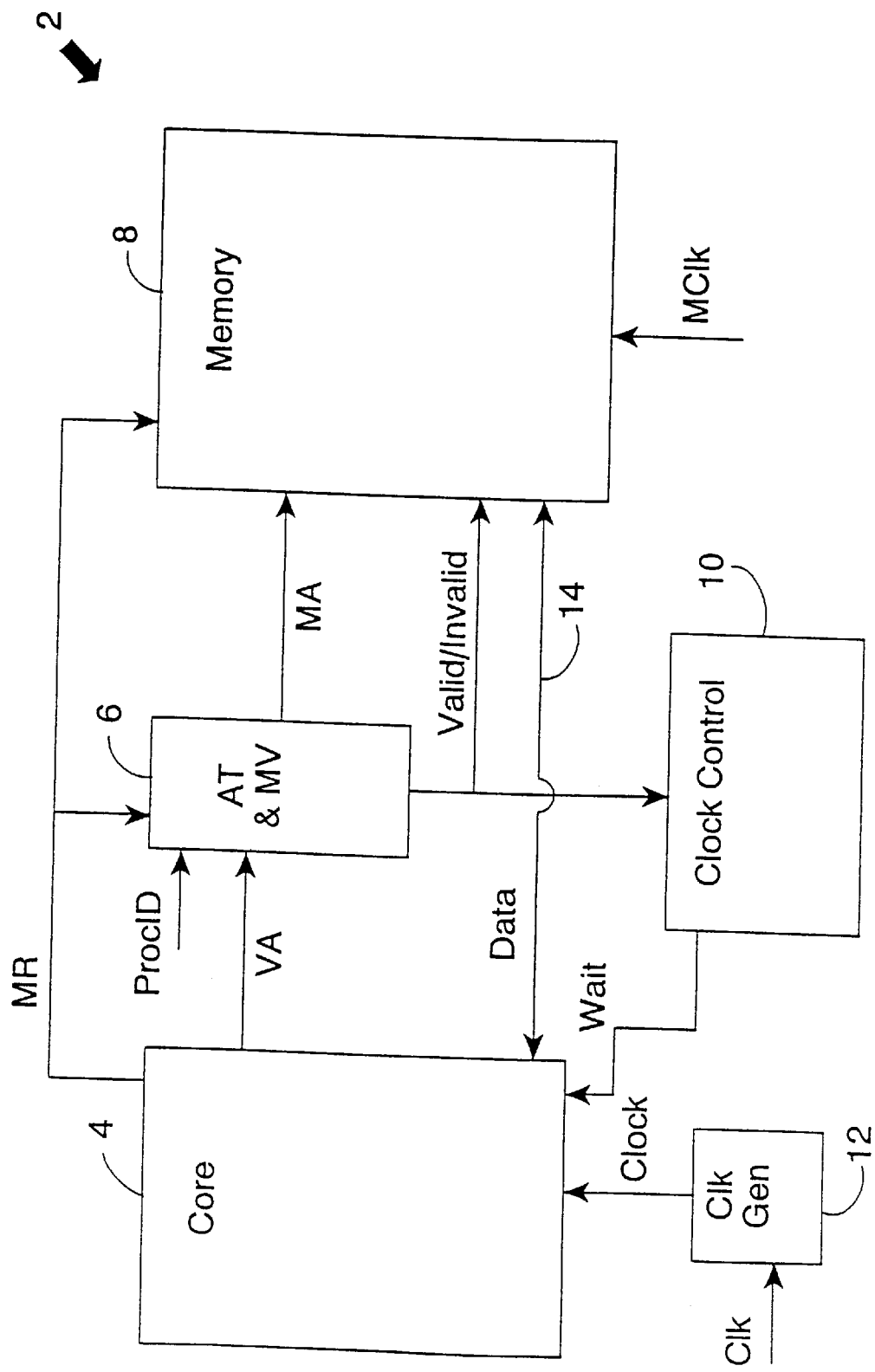
FIG. 2 schematically illustrates a modification of the system of FIG. 1.

FIG. 2 illustrates a modification of the circuit of FIG. 1 in which the mechanism used to abort the memory access is modified. In this embodiment, the clock control circuit 10 asserts a wait signal to the processor core 4 that indicates to the processor core that the memory system 8 is not ready and the data bus 14 does not contain valid data.

When the address translation and mapping validity circuit 6 has corrected the incorrect prediction, and the memory access restarted, then this is indicated to the clock control circuit 10 via a Valid signal and then the wait signal to the processor core may be released.

Figure 3:
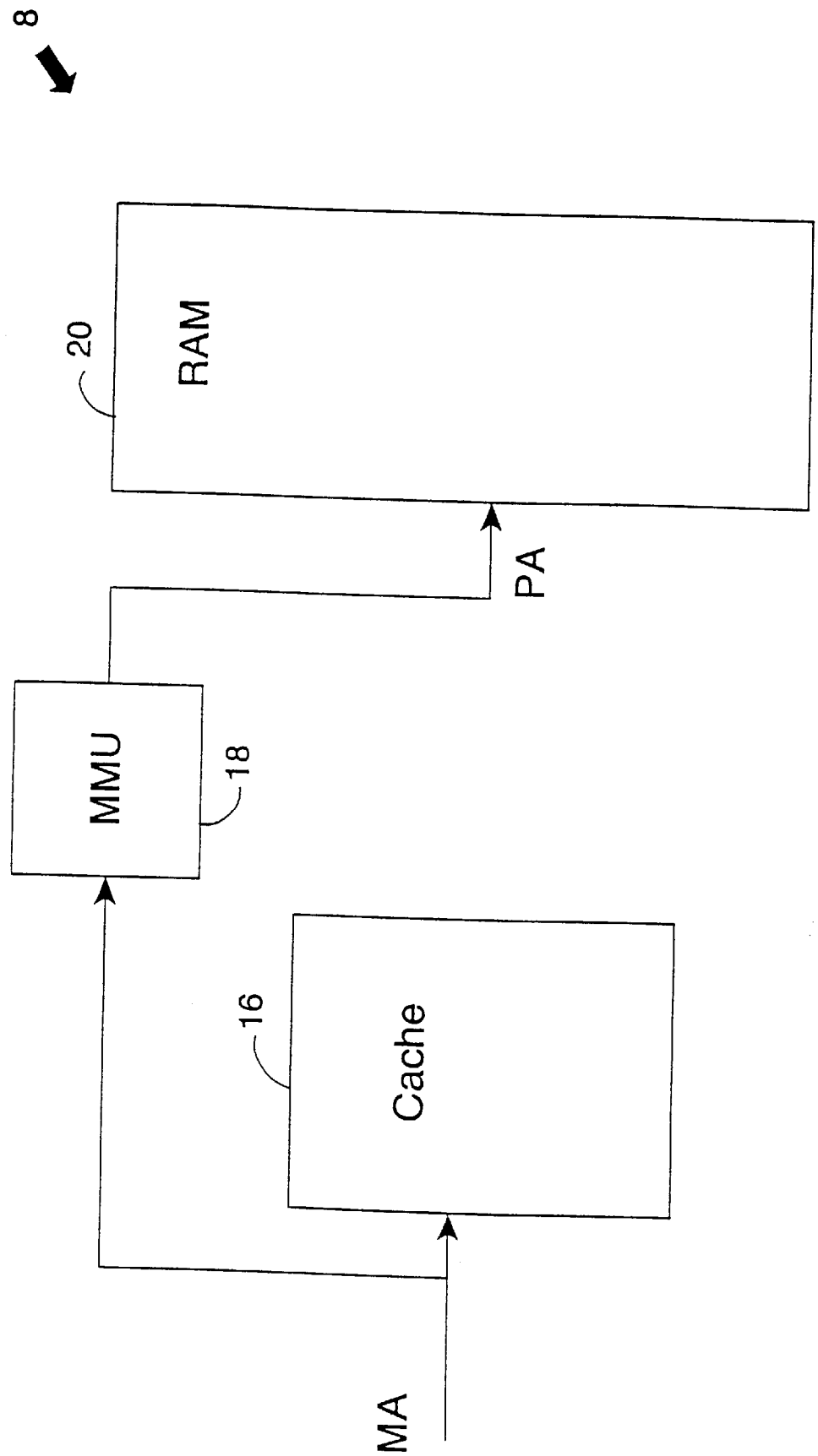
FIG. 3 illustrates an example of a hierarchical memory system utilizing both a partially mapped address and a physical address.

FIG. 3 illustrates a hierarchical memory system that may be used in the embodiments of FIGS. 1 and 2. This hierarchical memory system comprises a cache memory 16, a memory management unit 18 and an off-chip random access memory 20. The cache memory 16 provides high speed access to cached data in response to partially translated mapped addresses MA produced by the address translation and mapping validity circuit 6. These mapped addresses MA are also provided to the memory management unit 18. The memory management unit 18 determines access permissions to the addresses in question and may itself abort the access through a different mechanism if the correct permissions are not in place. If a cache miss occurs, then the memory management unit 18 will also serve to perform a translation from the partially translated mapped address MA to a fully translated physical address PA that may be driven off-chip to the random access memory 20 to fetch the data concerned. This fetched data can then be cached within the cache 16.

The use of a partial remapping to produce the mapped address MA is advantageous in multi-tasking systems where the different threads share a common virtual address space, with different mapped addresses for the different processor threads. Thus, the different processing thread addresses can be distinguished within the cache memory 16 thus avoiding the need to flush the cache memory 16 upon a context switch.

Figure 4:
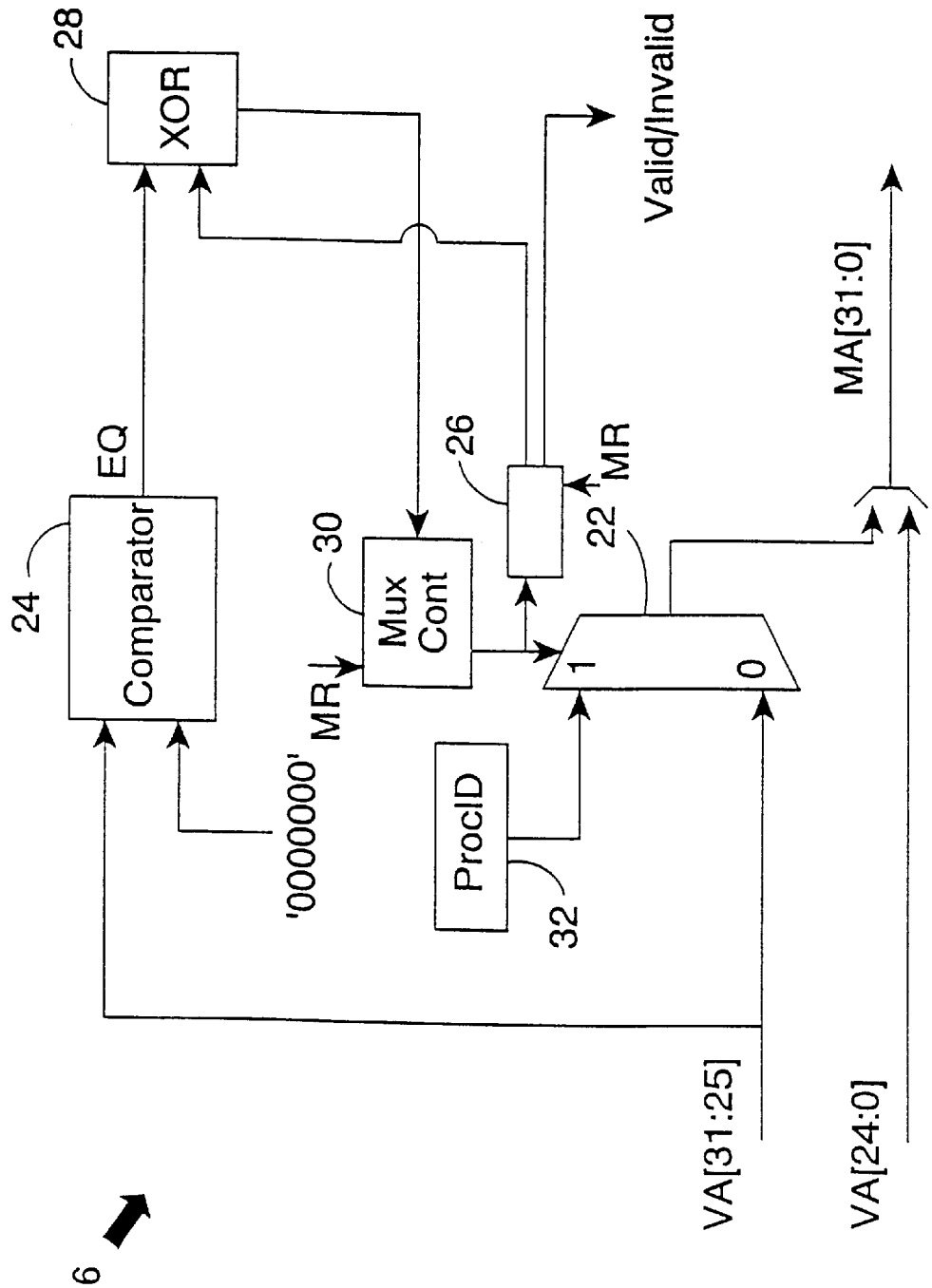
FIG. 4 illustrates an address translation and mapping validity circuit.

FIG. 4 illustrates an example of how the address translation and mapping validity circuit 6 may be implemented.

The lower order bits VA [24:0] of the virtual address are passed through to form the corresponding lower order bits of the mapped address without change. The top seven bits VA [31:25] of the virtual address are supplied to a multiplexer 22 and comparator 24. The comparator 24 compares these seven most significant bits with "0000000". If the virtual address has seven zeros as its most significant seven bits, then this indicates that the processing of the current thread is continuing entirely within the virtual address space of that particular thread. If the uppermost seven bits are not all zeros, then this indicates that the memory request is outside of its normal virtual address space. Such calls are used to adjust the address mapping parameter and to allow the core operating system to perform low level control operations.

The equality result EQ generated by the comparator 24 is used within a prediction circuit 26, the predicted mapping is supplied to an XOR-gate 28 as well as the equality result EQ. If the equality result EQ for the current virtual address does not equal the predicted mapping, then the XOR-gate 28 will produce a high result that is detected by a multiplexer controller 30. The multiplexer controller 30 responds to the output of the XOR-gate 28 output going from low to high by swapping the currently selected channel being used by the multiplexer 22 to supply the uppermost seven bits of the mapped address MA. Transitions from high to low do not swap the currently selected channel. Operation of the prediction circuit 26 and the multiplexer controller 30 are qualified by the memory request MR.

In this particular embodiment the multiplexer controller 30 provides the predicted mapping. However, it will be appreciated that more complex prediction mechanisms could be used.

In this way, should the virtual address change from having its uppermost seven bits being all zeros to these being non zero, then the multiplexer 22 will switch from selecting the process ID, ProcID, stored within a register 32 to instead pass the uppermost seven bits of the virtual address transparently (i.e. switch from the translation mode to the transparent mode). Conversely, should the uppermost seven bits of the virtual address change from being non-zero to being all zero then the multiplexer controller 30 swaps the multiplexer 22 from selecting the uppermost seven bits of the virtual address to instead selecting the processor ID, ProcID.

The value stored within the register 32 may be changed under program control by the processor core 4. This typically occurs when a call is made to the operating system to switch the process thread currently active. The processor identifier, ProcID, in this embodiment performs the role of the address translation mapping.

In operation, the comparator 24, prediction and validity circuit 26, XOR-gate 28 and multiplexer controller 30 take longer to operate than it takes for the virtual address VA to propagate through the multiplexer 22 with either the virtual address uppermost seven bits or the processor ID, ProcID, being selected, and thereby producing the mapped address MA. Thus, by the time the multiplexer controller 30 has determined whether or not the multiplexer 22 should be swapped, the mapped address has already been issued to the memory system 8 and the memory access is already under way. Accordingly, this memory access needs to be aborted and restarted using the properly translated mapped address generated after the multiplexer 22 has switched its state.

Figure 5:
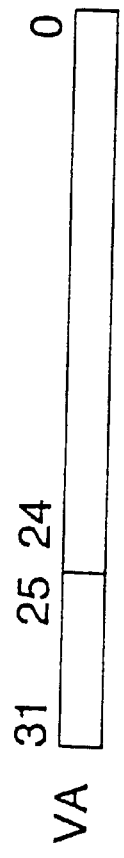
FIG. 5 illustrates the address translations that may be performed in the systems of FIGS. 1 to 4.
Figure 5:
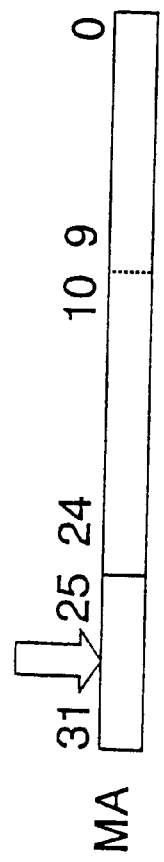
Figure 5:
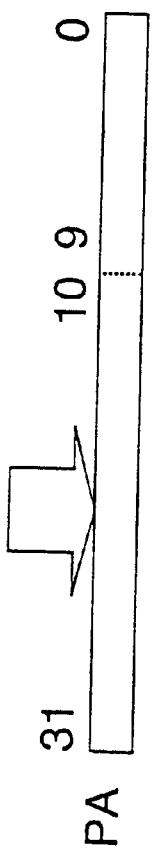

FIG. 5 schematically illustrates the various translations performed on the 32-bit virtual address that is produced by the processor core 4. The address translation and mapping validity circuit 6 performs the first translation in which the uppermost seven bits [31:25] are replaced by a process ID, ProcID, when operating in the translation mode. Alternatively, the uppermost seven bits may be passed unchanged in the transparent mode. This action transforms the virtual address VA to the partially translated mapped address MA.

The second stage of the translation that may possibly occur, e.g. in the case of a cache miss, is that performed by the memory management unit 18. In this example the minimum granularity of the memory supported by the MMU is 1 kB. In this case, the MMU 18 will leave the least significant 10 bits [9:0] unaltered whilst the uppermost 22 bits [31:10] are replaced with a value obtained in translating the address.

Figure 6:
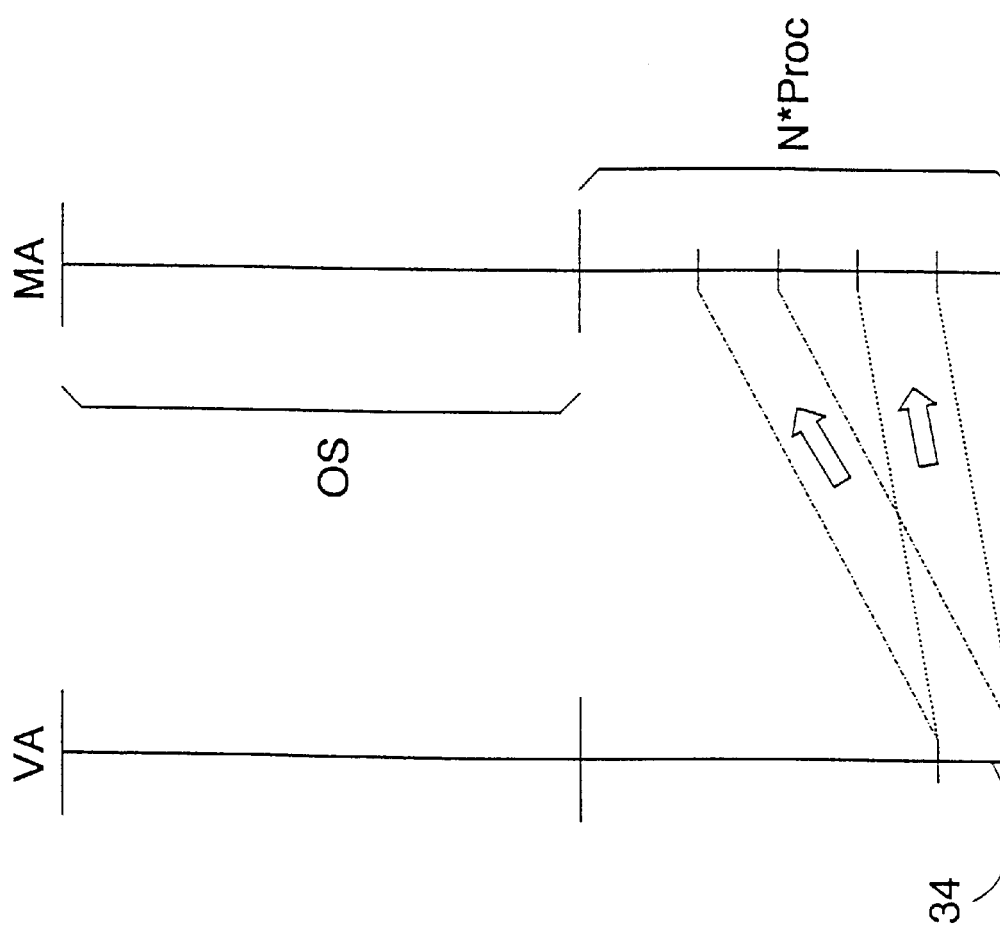
FIG. 6 schematically illustrates the address base within a multi-tasking system and the mappings used.

FIG. 6 illustrates the virtual address space and partially translated mapped addressed space of the system. In the virtual address space VA, each process considers it has a block of memory starting at zero. Within the mapped address space, these blocks of memory are separately mapped to different segments within the lower portion of the overall mapped address space. The upper portion of the mapped address space is reserved for the operating system. Calls from within a process operating in the address space 34 to the operating system are detected by the non-zero nature of the most significant seven bits and accordingly the address translation circuit 6 switches to transparent mode such that an inappropriate process identifier remapping is not performed and the call reaches the correct location within the operating system.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for data processing, said apparatus comprising:
    (i) a memory for storing data at mapped addresses within said memory;
    (ii) a processor core for requesting a memory access to a virtual address within said memory;
    (iii) an address translation circuit for performing a translation of said virtual address to a mapped address in accordance with a current address mapping prediction, wherein said address translation circuit has a translation mode which replaces a bit field within said virtual address with a bit field specified by said address mapping prediction, and a transparent mode in which said bit field within said virtual address is passed unaltered;
    (iv) a memory accessing circuit for accessing data from said memory using said mapped address; and
    (v) a mapping validity circuit for determining if said translation is valid for use in said memory access; wherein
    (vi) said mapping validity circuit does not determine if said translation is valid until after said memory accessing circuit has commenced said memory access; and further comprising
    (vii) an abort circuit for aborting said memory access if said translation is invalid; and
    (viii) a restart circuit for restarting said memory access with a valid translation of said virtual address to a valid mapped address, wherein said mapping validity circuit compares for equality said bit field within said virtual address of a current memory access with a predetermined bit field to produce an equality result and, if said equality result differs from that of a predicted result, swaps between said translation mode and said transparent mode.

2. Apparatus as claimed in claim 1, wherein said mapped address is an intermediate form between said virtual address to a physical address.

3. Apparatus as claimed in claim 2, wherein said memory accessing circuit includes a memory management unit that translates said mapped address to a physical address.

4. Apparatus as claimed in claim 1, comprising a cache memory, data within said cache being addressed by said mapped address.

5. Apparatus as claimed in claim 1, wherein said bit field specified by said address mapping prediction is a one-to-one correspondence to a process identifier that is set under program control.

6. Apparatus as claimed in claim 1, wherein said predetermined bit field is all zeros.

7. Apparatus as claimed in claim 1, wherein said processor core is controlled by a processor clock signal and said abort circuit aborts a memory access by stretching said processor clock signal.

8. Apparatus as claimed in claim 1, wherein said processor core is controlled by a processor clock signal and said abort circuit aborts a memory access by advancing said processor clock signal and waiting said processor core.

9. A method of data processing, said method comprising the steps of:

(i) storing data at mapped addresses within a memory;

(ii) requesting a memory access to a virtual address within said memory;

(iii) performing a translation of said virtual address to a mapped address in accordance with a current address mapping prediction, wherein in a translation mode a bit field within said virtual address is replaced with a bit field specified by said address mapping prediction, and in a transparent mode said bit field within said virtual address is passed altered;

(iv) accessing data from said memory using said mapped address; and (v) determining if said translation is valid for use in said memory access; wherein (vi) said step of determining does not determine if said translation is valid until after said memory access has commenced; and further comprising the step of (vii) aborting said memory access if said translation is invalid;

(viii) restarting said memory access with a valid translation of said virtual address to a mapped address;

(ix) comparing for equality a bit field within said virtual address of said memory with a predetermined bit field and providing an equality result; and (x) if said equality result differs from a predicted result, swapping between said translation mode and said transparent mode.

* * * * *

UNITED STATES PATENT AND TRADEMARK OFFICE
CERTIFICATE OF CORRECTION

PATENT NO.       : 6,353,879 B1
APPLICATION NO.  : 09/252927
DATED            : March 5, 2002
INVENTOR(S)      : Middleton et al.

It is certified that error appears in the above-identified patent and that said Letters Patent is hereby corrected as shown below:

Column 8, line 10, "altered" should read --unaltered--.

Signed and Sealed this

Fifteenth Day of January, 2008

JON W. DUDAS
*Director of the United States Patent and Trademark Office*